(12) United States Patent
Scheffel et al.

(10) Patent No.: US 9,119,013 B1
(45) Date of Patent: Aug. 25, 2015

(54) SATELLITE BASED TRACKING AND DATA DEVICE WITH MULTI-FUNCTION RADIO FREQUENCY INTERFACE

(75) Inventors: Joe Scheffel, Three Forks, MT (US);
Troy E. Lanes, Belgrade, MT (US);
Pierre H. Parent, Denton, TX (US);
Richard Burtner, Broadlands, VA (US);
Jeffrey Smith, Dallas, TX (US)

(73) Assignee: Numerex Corp., Atlanta, GA (US)

( * ) Notice: Subject to any disclaimer, the term of this patent is extended or adjusted under 35 U.S.C. 154(b) by 232 days.

(21) Appl. No.: 13/081,954

(22) Filed: Apr. 7, 2011

Related U.S. Application Data

(60) Provisional application No. 61/322,503, filed on Apr. 9, 2010.

(51) Int. Cl.
*G08B 1/08* (2006.01)
*H04W 4/00* (2009.01)
*G07C 5/00* (2006.01)

(52) U.S. Cl.
CPC *H04W 4/00* (2013.01); *G07C 5/008* (2013.01)

(58) Field of Classification Search
CPC .................................. H04W 4/00; G07C 5/008
USPC ........................................... 340/994; 235/375
See application file for complete search history.

(56) References Cited

U.S. PATENT DOCUMENTS

| 8,555,100 | B2* | 10/2013 | Liao | 713/324 |
| 2006/0055564 | A1* | 3/2006 | Olsen et al. | 340/994 |
| 2009/0119657 | A1* | 5/2009 | Link, II | 717/171 |
| 2009/0171528 | A1* | 7/2009 | Golde et al. | 701/35 |
| 2010/0214079 | A1* | 8/2010 | Desjeux | 340/10.34 |

* cited by examiner

*Primary Examiner* — Shirley Lu
(74) *Attorney, Agent, or Firm* — Bell Nunnally & Martin LLP; Craig J. Cox

(57) ABSTRACT

A remote monitoring device is described that includes a microprocessor, a location determination unit connected to the microprocessor and operable to determine a location of the remote monitoring device. One or more interfaces connect the microprocessor to one or more sensors, wherein the one or more interfaces includes a multi-function radio frequency interface to communicate with wireless sensors. A radio frequency identification (RFID) interface interacts with RFID readers using the multi-function radio frequency interface, and a configuration interface to allow a user to configure the monitoring device also uses the multi-function radio frequency interface. The monitoring device uses a transmitter to transmit the location, status and collected information.

13 Claims, 4 Drawing Sheets

SATELLITE BASED TRACKING AND DATA DEVICE WITH MULTI-FUNCTION RADIO FREQUENCY INTERFACE

CROSS REFERENCE TO RELATED DATA

This application claims the benefit of U.S. Provisional Patent Application No. 61/322,503, filed Apr. 9, 2010, titled "Satellite Based Tracking and Data Device With Multi-Function Radio Frequency Interface" the entire contents of which are hereby incorporated by reference.

TECHNICAL FIELD

The present disclosure is directed to satellite based monitoring, and radio frequency tracking and data gathering devices with multi-function radio frequency interfaces.

BACKGROUND OF THE INVENTION

The use of satellites is well known as a mechanism for both providing relatively accurate positioning information and collecting data from remote locations by means of small monitoring devices for tracking and data collection. Tracking and data collection device useful for tracking or monitoring fixed objects such as pipelines, oil wells, storage tanks, etc. and mobile objects such as vehicles or packages, use satellite, cellular or radio frequency (RF) transmissions to transmit location, status, measurements and other data to a central site where a record of the object's status, location and other data can be maintained. The monitoring devices are normally connected to one or more sensors, which collect data of interest, by wires that run between the monitoring device and the sensor. The use of wires to connect remote sensors to the monitoring device limits the number and type of sensors that can be used with the monitoring device.

Further, many remote monitoring devices are used in circumstances where a permanent power source is not available. In such cases the monitoring device must be powered by batteries. Keeping all of the monitoring devices sensors, receivers and transmitter operating at all times causes a serious drain on battery power and significantly shortens the useful operating time of the tracking device. Remote monitoring devices would benefit from schemes to minimize the drain on batter resources to maximize the useful operating time of the device.

BRIEF SUMMARY OF THE INVENTION

Embodiments of the present invention describe a remote monitoring device that includes a microprocessor, a location determination unit connected to the microprocessor and operable to determine a location of the remote monitoring device. One or more interfaces connect the microprocessor to one or more sensors, wherein the one or more interfaces includes a multi-function radio frequency interface to communicate with wireless sensors. A radio frequency identification (RFID) interface interacts with RFID readers using the multi-function radio frequency interface, and a configuration interface to allow a user to configure the monitoring device also uses the multi-function radio frequency interface. The monitoring device uses either transmitter to transmit the location, status and collected data. The multi-function radio can be used when it is determined that an RF link can be established via a relay receiver.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
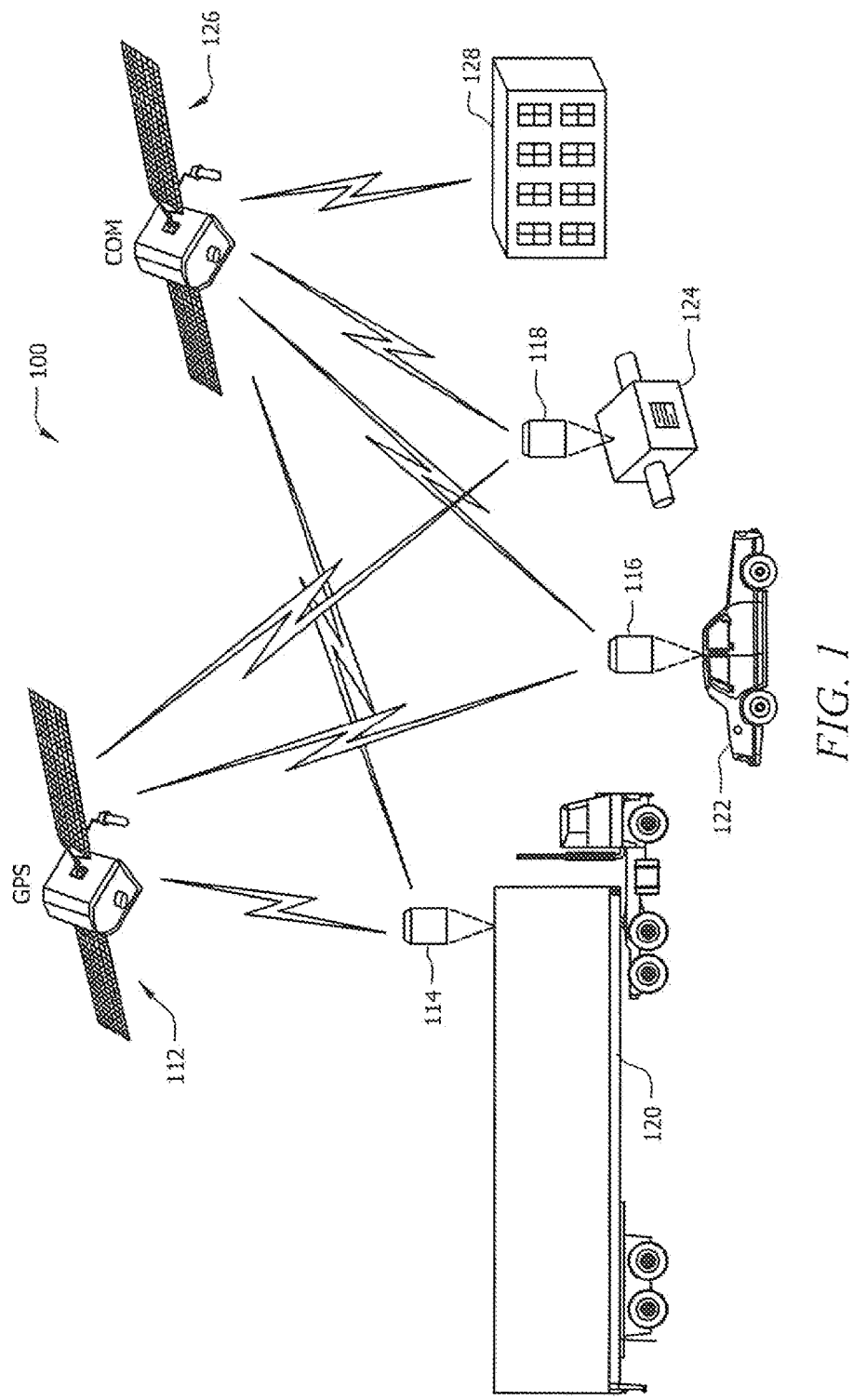
FIG. 1 is a diagram of a monitoring system incorporating a remote monitoring device according to the concepts described herein.

Referring now to FIG. 1, a system for monitoring objects using a remote device according to the concepts described herein is shown. The system 100 can use the global positioning system (GPS) 112 to provide location information to remote monitoring devices 114, 116, and 118. While GPS location determination is well known and preferred, other location determination systems can be used in place of or in conjunction with the global positioning system (GPS) to provide location information to the remote monitoring devices. Such other location determination systems can include fixed beacons, cellular signals, or other terrestrial or space based systems.

Monitoring devices 114, 116, and 118 are located on, in, or attached to, fixed or mobile objects so that an interested party can monitor the objects in real time. Such objects can include, but are not limited to, vehicles, such as trucks 120, cars 122, packages or containers. Fixed devices can include pipelines 124, storage facilities, wells, or other fixed location. Monitoring devices can also be deployed to monitor and report environmental conditions.

Embodiments of the monitoring devices use satellite transmitters to send data back to a data collection point 128 over a satellite communications network 126.

Figure 2:
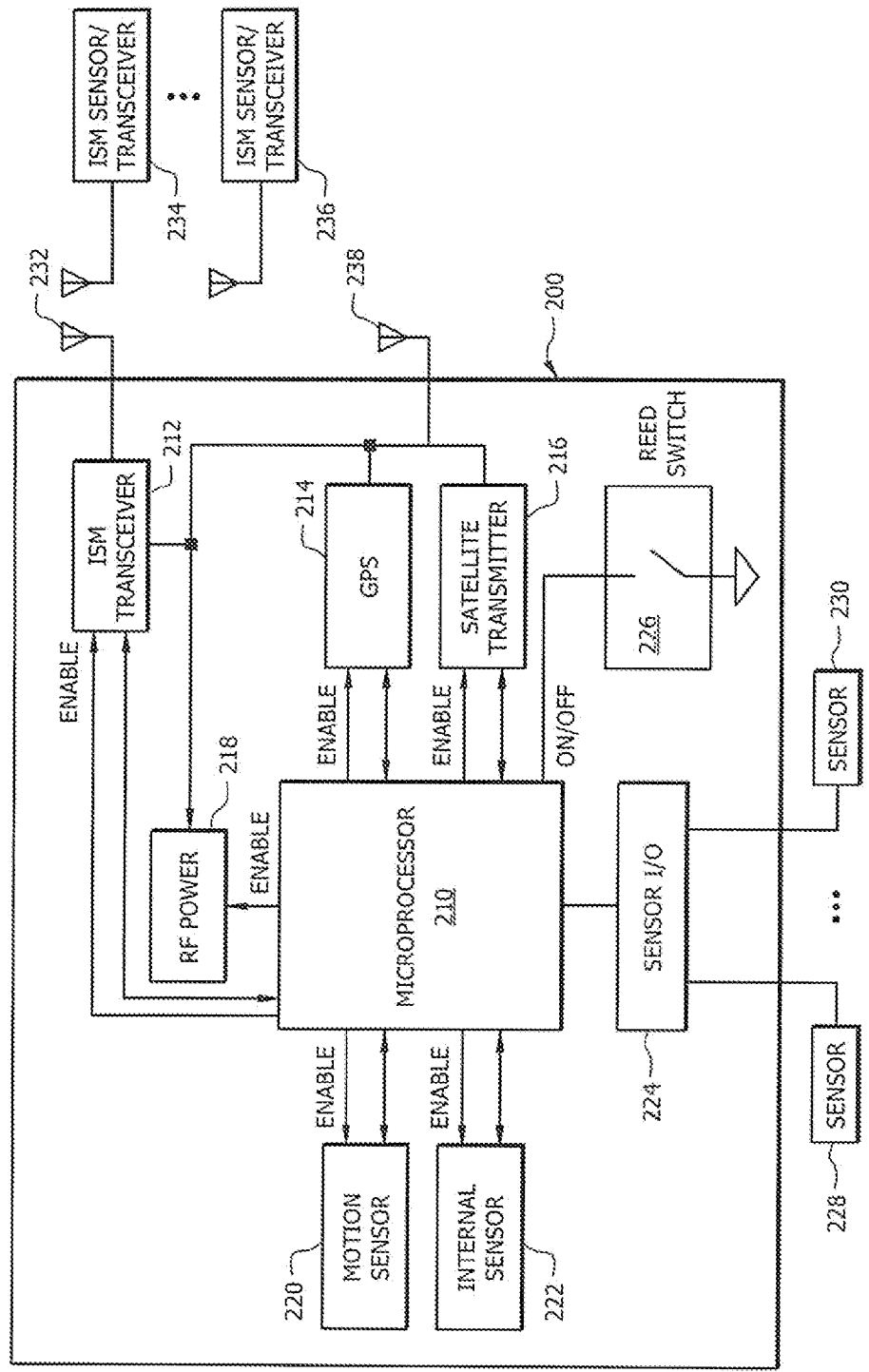
FIG. 2 is a block diagram of a remote monitoring device according to the concepts described herein.

Referring now to FIG. 2 an embodiment of a monitoring device according to the concepts described herein is shown. Monitoring device 200 includes a programmable microprocessor 210 which can have internal and external memory to hold programming and data. Microprocessor 210 is programmed to communicate with and gather data from a variety of sensors operably connected by various mechanisms to monitoring device 200. Microprocessor 210 is also programmed to communicate with a satellite communications network, as shown in FIG. 1, to send location, status and collected data to a central repository or other designated recipient.

In order to communicate with various inputs and outputs to the monitoring device, microprocessor 210 is connected to a transceiver, which operates on the industrial, scientific and medical (ISM) radio bands. In addition to ISM transceiver 212, monitoring device 200 includes GPS unit 214 and satellite transmitter 216. GPS unit 214 is used to receive signals using satellite antenna 238 from the GPS satellite network and to either determine the location of the device from those signals or to pass the raw GPS data to microprocessor 210 where it is processed or passed as raw data to the data collection center 128 from FIG. 1. Satellite transmitter 216 is used with satellite antenna 238 to transmit data from monitoring device 200 using satellite communications network 126. Power for ISM transmitter 212, antenna 232, GPS unit 214, satellite transmitter 216, and satellite antenna 238 are provided by RF power module 218. RF power module 218 is controlled by microprocessor 210, allowing microprocessor to enable and disable RF power module 218 to conserve battery power when monitoring device 200 is not transmitting or receiving.

Monitoring device 200 can collect data from sensors using a variety of interfaces. Sensors may be embedded in monitoring device 200, such as motion sensor 220 or other types of internal sensors 222 that can be located within monitoring device 200. In addition to embedded sensors, monitoring device 200 can communicate with a plurality of external sensors. External sensors may be connected by wires such as sensors 228 and 230 using, if required, a sensor I/O bus 224 to intermediate between the sensors and the microprocessor 210. Additionally, sensors, such as sensors 234 and 236, may be connected wirelessly using the ISM transceiver to communicate with the monitoring device 200.

Sensors can be of any type or functionality, including temperature sensors, motion detectors, pressure sensors, volume sensors that can measure either liquid volume or cargo volume, level sensors, door open/close sensors, RF activity sensors, chemical sensors such as carbon monoxide, carbon dioxide, or chemical of interest, flow rate sensors, light sensors, tire sensors, or any other sensor present or future whose data might be relevant in a remote monitoring situation. While individual designs of a monitoring device may be limited to a particular number of connected sensors over any particular interface, any number and type of sensors may be connected to a monitoring device in accordance with the concepts described herein.

As will be discussed in greater detail with reference to FIG. 3, microprocessor 210 is programmed to enable and disable individual components of monitoring device 200 to conserve battery power and extend the functional capabilities of the device. Reed switch 226 allows monitoring device to be turned on and off through use of a magnetic field.

In addition to the sensors and communications elements described above, embodiments of monitoring device 200 can have radio frequency identification (RFID) capabilities. Embodiments of monitoring device 200 will be able to broadcast RFID signals, either in response to an electromagnetic field from RFID reader or on various intervals, identifying the particular monitoring device by means of an electronic serial number (ESN).

Monitoring device 200 is capable of being configured and programmed by a connection to an appropriately programmed computer or other device. The connection can be either hard wired, such as by using a USB, or other connection, or could preferably be wireless using the ISM transceiver and an appropriate protocol, such as Bluetooth or the like. This interface allows a technician to view the current configuration of the monitoring device, to reconfigure or alter the configuration and to modify the current programming of the device or load new programming into the device.

Pairing a monitoring device with a sensor, either wireless or wired, can be done by a technician or can be done automatically by the device. Each monitoring device can be placed into pairing mode by physical switch or software command. A preferred process and communications flow is shown and described with reference to FIG. 4. In an alternative embodiment, sensors in pairing mode broadcast a handshake request every 500 ms until a pairing packet is received. Once desired sensors are identified a command, wireless or wired as appropriate, is sent containing information that "pairs" the devices. Information from monitoring device, or base, can contain: Message type; ESN of the monitoring device to be paired with; Current Time; Time of next scheduled packet; sensor sample/transmit interval; checksum, and/or any other useful information. The acknowledgement, or ACK, from sensor device can contain: Message Type; ESN of Sensor; ACK of next sync time; checksum, and/or any other useful information. The monitoring device can also be programmed to acknowledge to a host computer the information of any or all paired sensors. While examples of process and communications flows are described herein, one skilled in the art will understand that other flow, processes, or communications protocols can be used while remaining within the scope of the concepts described herein.

In one embodiment the monitoring device can be programmed to interact with a sensor in sensor information transfer mode as follows: N seconds (which is configurable, but can have a default to a particular value such as 10 seconds) before a scheduled data transfer (as synchronized in the pairing mode or previous data transfer) the sensor broadcasts information at intervals, such as every 250 ms, while listening for an ACK from the monitoring device. The information can include: i) Message Type; ii) ESN; iii) Sensor data information; iv) failed packet count; v) Battery information or other status information, etc; and vi) checksum. The sensor continues to broadcast for M seconds (configurable with a default). Once the monitoring device receives the information it transmits an ACK to the sensor unit. The ACK con contain the following information: i) Message type; ii) time of next sync; and iii) checksum. If the sensor does not receive an ACK, it can be assumed the packet was lost. The next sample/transmission will take place at the time of the currently processing message plus the interval time. As described above, the monitoring device can be programmed to transmit the sensor information via satellite interface.

In a configuration/query mode, the monitoring device can be programmed to act as follows. Every X seconds (configurable with a default) the monitoring device will broadcast its ESN and listen for 50 ms for a configuration or query packet from a host computer or other configuration device. If a handshake packet is received by monitoring device from a configuration device or host computer it will then enter a listening mode for up to 30 seconds for a configuration message. The monitoring device will then ACK a handshake packet and keep alive packets can be sent from the host computer or configuration device if it detects user interaction. This allows programming or querying without delay. The configuration message will be sent by the host computer or configuration device and acknowledged by the monitoring device. The host computer or configuration device can, optionally terminate the reprogramming or configuration session with a terminate packet.

With respect to operation of aspects of the RFID functionality of the monitoring device, embodiments of the monitoring device can be programmed as follows. Every X seconds (configurable with a default) the monitoring device can transmit it's ESN Y times with a pause, such as 50 milliseconds, between transmissions. RFID readers will receive the beacon and store/re-transmit the data accordingly. Upon motion (configurable), the monitoring device can transmit every 5 seconds for 5 minutes. This enhances the acquisition of a signal from an asset moving out of a known area. Stationary RFID readers can be pre-programmed with a GPS location and the reader can re-forward the location of the monitoring device via a network connection, such as for use in location based services (LBS) applications. Mobile RFID readers can be paired with a GPS receiver and can re-forward the location of the monitoring device via network such as for use in LBS applications.

Figure 3:
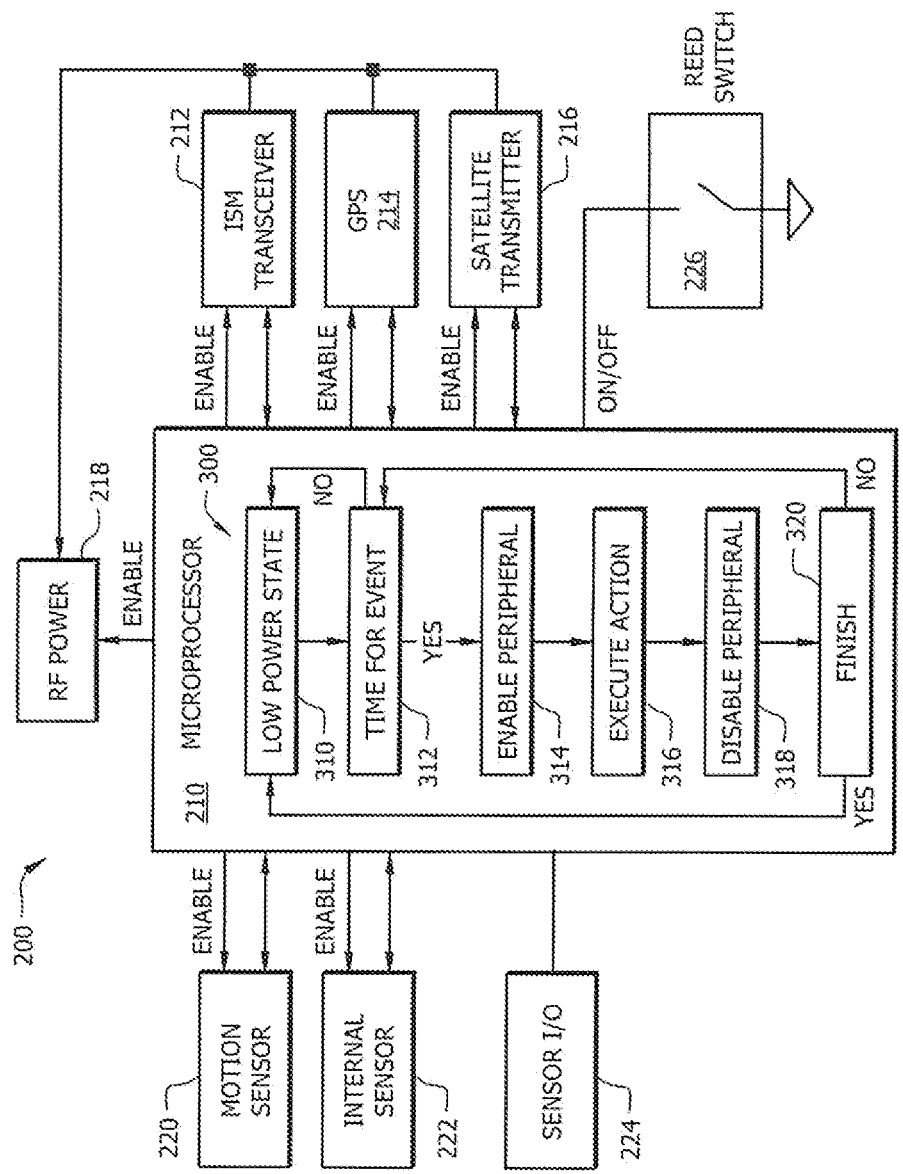
FIG. 3 is a block diagram showing a power management scheme for the remote monitoring device of FIG. 2.

Referring now to FIG. 3, a power saving scheme for a monitoring device is shown in greater detail. Monitoring device 200, as described with respect to FIG. 2, in many applications is required to operate using power from a battery or batteries. To extend the operating time of the monitoring device, the monitoring device can be programmed to enable and disable, or turn on and off, certain peripherals, such as the ISM transceiver 212, the GPS unit 214, the satellite transmitter 216, the RF power module 218, the embedded sensors 220 and 222, and/or the sensor I/O interface 224.

In one embodiment, a power scheme 300 operates as follows. The monitoring unit begins in a low power state with one, more, or all of the peripherals powered down, as shown by state 310. In state 312 the microprocessor determines if it is time for an event. If not, the monitoring device remains in a low power state as shown by state 310. If it is time for an event, the microprocessor enables one or more selected peripherals that are required to operate for the event as shown by state 314. Microprocessor 210 then executes the actions required as shown by state 316, and then disables the one or more peripherals when the action is complete as shown by state 318. When the action is complete, as shown by state 320, the monitoring device returns to its low power state shown by state 310.

Figure 4:
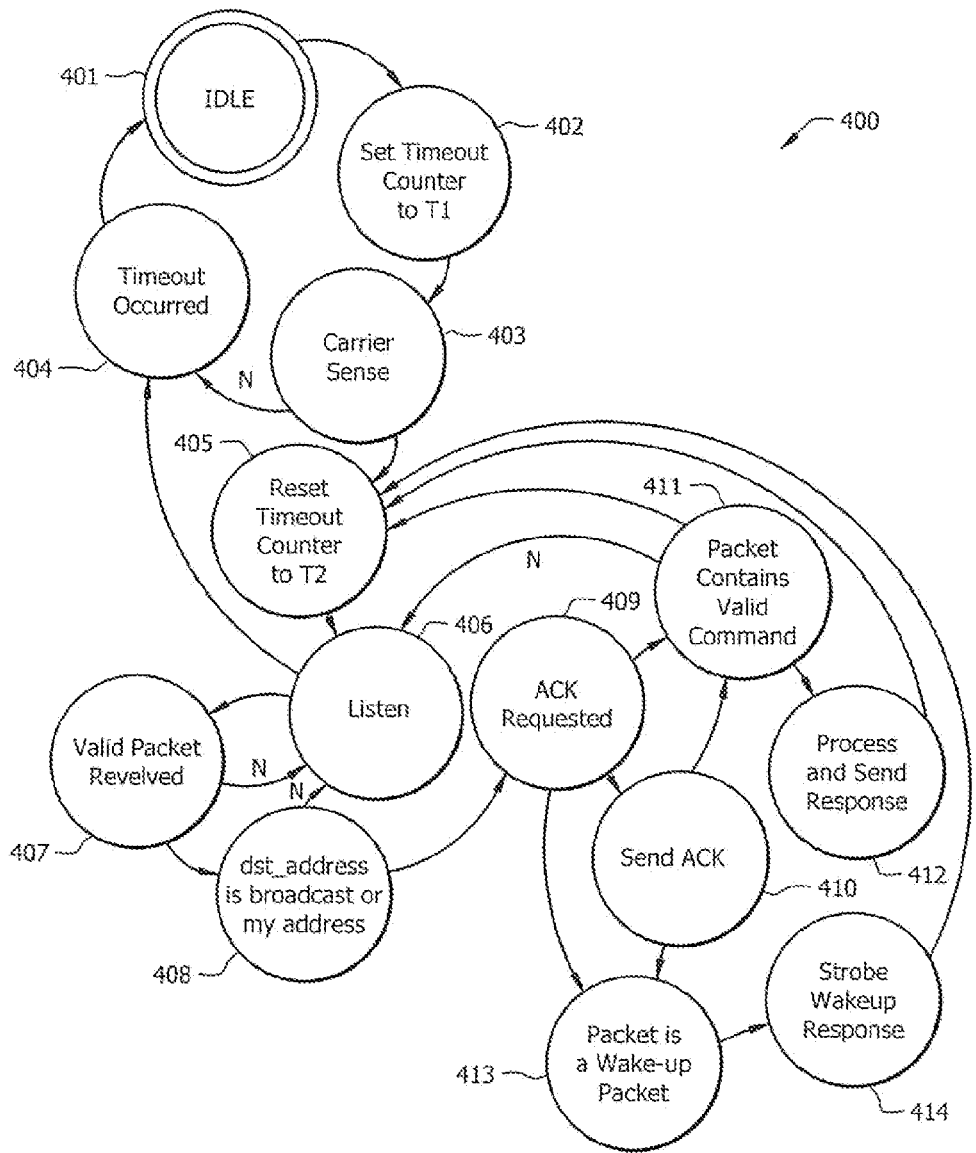
FIG. 4 is a process and communications flow chart illustrating an embodiment of a process and communications flow for a remote monitoring device according to the concepts described herein.

Referring now to FIG. 4, an embodiment of a process and communications flow usable by a mobile device according to the concepts described herein. Flow 400 includes an idle state 401. From idle state 401 a timeout counter is set to T1 in process 402. After the timeout counter is set, the flow enters carrier sense mode 403 to determine if a carrier signal is sensed indicating an incoming message. If no signal is sensed, the flow passes to process 404 when a timeout of the counter occurs, after which the flow returns to idle state 401.

If a signal is sensed in carrier sense mode 403, the flow passes to process 405 which sets a timeout counter to time T2. From process 405, the flow enters into listen mode 406 where it waits to see if a valid packet is received in process 407. If timeout counter T2 expires, as represented by process 404, while the flow is in listen mode 406, the flow returns to idle state 401. If a packet is received, the flow moves to process 408 which determines if the destination address is the address of this mobile device. If it is not, the flow returns to listen mode 406; if it is, the flow passes to process 409 which determines if the packet is a wake up packet or if the packet contains a valid command as well as determining if an ACK has been requested. If no ACK is requested, the flow passes directly to either wake up packet process 413 or valid command process 411, as appropriate. If an ACK is requested, the flow first sends the appropriate ACK in process 410 before passing to wake up packet process 413 or valid command process 411, as appropriate.

If a packet is received, the flow moves to process 408 which determines if the destination address is the address of this mobile device. If it is not, the flow returns to listen mode 406; if it is, the flow passes to process 409 which determines if the packet is a wake up packet or other packet as well as determining if an ACK has been requested. If no ACK is requested, the flow passes directly to either wake up packet process 413 for wake up packets or valid command determination 411, for other packets. If an ACK is requested, the flow first sends the appropriate ACK in process 410 before passing to wake up packet process 413 or valid command determination 411, as appropriate. From wake up packet process 413, the flow sends a wake up response 414 before returning to counter T2 reset 405 and listen mode 406. From valid command determination 411, if the packet contained a valid command, that command is processed and a response is sent in process 412 before returning to counter T2 reset 405 and listen mode 406. If the packet did not contain a valid command, the process again returns to counter T2 reset 405 and listen mode 406.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A remote monitoring device comprising:
   a microprocessor;
   a location determination unit connected to the microprocessor and determines a location, of the remote monitoring device;
   one or more interfaces connecting the microprocessor to one or more sensors collecting information, wherein the one or more interfaces includes a multi-function radio frequency interface to communicate with wireless sensors;
   a radio frequency identification (RFID) interface to interact with RFID readers using the multi-function radio frequency interface;
   a configuration interface m allow a user to configure the monitoring device using the multi-function radio frequency interface, and
   a transmitter to transmit the location status and collected information;

wherein the microprocessor of remote monitoring device individually selectively enables the location determination trait, the one or more interfaces, the RFID interface, and the transmitter when an action is required independent of the state of the battery power, and thereafter disables the enabled one of the location determination unit, the one or more interfaces, the RFID interface, and the transmitter when not in use in order to conserve battery power.

2. The remote monitoring device of claim 1 wherein the one or more interfaces includes a wireless interface.

3. The remote monitoring device of claim 1 wherein the one or more interfaces includes a wired interface.

4. The remote monitoring device of claim 1 wherein the location determination unit is a GPS unit.

5. The remote monitoring device of claim 1 further comprising one or more internal sensors monitoring the condition of the remote monitoring device.

6. The remote monitoring device of claim 5 wherein one internal sensor is a motion sensor.

7. The remote monitoring device of claim 1 wherein the transmitter is a satellite transmitter.

8. The remote monitoring device of claim 1 wherein the transmitter is a cellular transmitter.

9. A system for monitoring conditions at remote locations comprising:
 a plurality of remote monitoring devices, each remote monitoring device comprising:
 a microprocessor;
 a location determination unit connected to the microprocessor and determines a location of the remote monitoring device:
 one or more interfaces connecting the microprocessor to one or more sensors collecting information, wherein the one or more interfaces includes a multi-function radio frequency interface to communicate with wireless sensors; and
 a transmitter to transmit the location, status and collected information;
 wherein the microprocessor of remote monitoring device individually selectively enables the location determination unit, the one or more interfaces, and the transmitter when an action is required independent of the state of the battery power, and thereafter disables the enabled one of the location determination unit, the one or more interfaces, the RFID interface, and the transmitter when not in use in order to conserve battery power; and
 a central monitoring station sending configuration and control signals to each of the remote monitoring devices, and receiving data collected by each of the remote monitoring devices.

10. The system of claim 9 wherein one or more remote monitoring devices further comprises a radio frequency identification (RFID) interface to interact with RFID readers using the multi-function radio frequency interface.

11. The system of claim 9 wherein one or more remote monitoring devices further comprises a configuration interface to allow a user to configure the monitoring device using the multi-function radio frequency interface.

12. The system of claim 9 wherein the one or more interfaces connecting the microprocessor to one or more sensors includes both a wired interface and a wireless interface.

13. The system of claim 9 further comprising an internal motion sensor.

\* \* \* \* \*